US012073529B2

(12) United States Patent
Santhar et al.

(10) Patent No.: US 12,073,529 B2
(45) Date of Patent: Aug. 27, 2024

(54) CREATING A VIRTUAL OBJECT RESPONSE TO A USER INPUT

(71) Applicant: International Business Machines Corporation, Armonk, NY (US)

(72) Inventors: Sathya Santhar, Chennai (IN); Sarbajit K. Rakshit, Kolkata (IN); Sridevi Kannan, Chennai (IN); Samuel Mathew Jawaharlal, Chennai (IN)

(73) Assignee: International Business Machines Corporation, Armonk, NY (US)

( * ) Notice: Subject to any disclaimer, the term of this patent is extended or adjusted under 35 U.S.C. 154(b) by 27 days.

(21) Appl. No.: 17/526,916

(22) Filed: Nov. 15, 2021

(65) Prior Publication Data

US 2023/0154126 A1 May 18, 2023

(51) Int. Cl.
| | |
|---|---|
| *G06T 19/20* | (2011.01) |
| *G06F 18/214* | (2023.01) |
| *G06N 3/044* | (2023.01) |
| *G06N 3/045* | (2023.01) |
| *G06N 3/047* | (2023.01) |
| *G06N 3/08* | (2023.01) |
| *G06N 3/084* | (2023.01) |
| *G06N 3/088* | (2023.01) |
| *G06V 10/82* | (2022.01) |
| *G06V 40/20* | (2022.01) |

(52) U.S. Cl.
CPC .......... *G06T 19/20* (2013.01); *G06F 18/2148* (2023.01); *G06N 3/045* (2023.01); *G06N 3/08* (2013.01); *G06N 3/044* (2023.01); *G06N 3/047* (2023.01); *G06N 3/084* (2013.01); *G06N 3/088* (2013.01); *G06T 2219/2016* (2013.01); *G06V 10/82* (2022.01); *G06V 40/20* (2022.01)

(58) Field of Classification Search
CPC ..... G06T 19/20; G06F 18/2148; G06N 3/045; G06N 3/08
See application file for complete search history.

(56) References Cited

U.S. PATENT DOCUMENTS 9,696,547 B2 * 7/2017 Kinnebrew ............. G06F 3/011
10,504,268 B1 12/2019 Huang et al.
(Continued)

OTHER PUBLICATIONS

Worrallo, A Multiple Optical Tracking Based Approach for Enhancing HandBased Interaction in Virtual Reality Simulations—202009, University of Wolverhampton (Year: 2020).*
(Continued)

*Primary Examiner* — YuJang Tswei (57) ABSTRACT

Provided is a system and method for moving a virtual object within virtual space in response to an external input supplied by a user. A machine learning model may predict a movement of the virtual object and implement such movement in a next frame of the virtual space. An example operation may include one or more of receiving a measurement of an external input of a user with respect to a virtual object displayed in virtual space, predicting, via execution of a machine learning model, a movement of the virtual object in the virtual space in response to the external input of the user based on the measurement of the external input of the user, and moving the virtual object in the virtual space based on the predicted movement of the virtual object by the machine learning model.

16 Claims, 8 Drawing Sheets

(56) References Cited

U.S. PATENT DOCUMENTS

| | | | |
|---|---|---|---|
| 10,535,151 B2 | 1/2020 | Bleyer et al. | |
| 11,017,560 B1 | 5/2021 | Gafni et al. | |
| 11,144,117 B1* | 10/2021 | Choudhuri | G06N 20/00 |
| 11,625,898 B2* | 4/2023 | Bradner | A63F 13/5255 |
| | | | 345/419 |
| 2015/0139505 A1 | 5/2015 | Vladimirov et al. | |
| 2015/0289823 A1* | 10/2015 | Rack-Gomer | A61B 5/743 |
| | | | 600/365 |
| 2015/0302665 A1* | 10/2015 | Miller | G02B 27/0093 |
| | | | 345/419 |
| 2018/0348854 A1* | 12/2018 | Powers | G06T 7/73 |
| 2019/0349464 A1* | 11/2019 | Ma | G06F 3/017 |
| 2020/0410736 A1 | 12/2020 | Lu et al. | |
| 2021/0169417 A1* | 6/2021 | Burton | A61B 5/4857 |
| 2021/0174137 A1* | 6/2021 | Kim | G06F 18/285 |
| 2021/0272329 A1* | 9/2021 | Katsumata | G06T 7/70 |
| 2022/0101593 A1* | 3/2022 | Rockel | A63F 13/426 |
| 2022/0146818 A1* | 5/2022 | Inoue | B60K 35/00 |
| 2022/0366494 A1* | 11/2022 | Cella | H04L 9/50 |

OTHER PUBLICATIONS

Wang et al, Deep learning for sensor-based activity recognition—A survey—2018, Elsevier—(Year: 2018).*

Aigner et al., FutureGAN: Anticipating the Future Frames of Video Sequences using Spatio-Temporal 3d Convolutions in Progressively Growing GANs, preprint-work in progress, arXiv:1810.01325v2 [cs.CV] Nov. 26, 2018.

Kang et al., A Comparative Analysis of 3D User Interaction: How to Move Virtual Objects in Mixed Reality, 2020 IEEE Conference on Virtual Reality and 3D User Interfaces (VR), 2642-5254/20/$31.00 © 2020 IEEE DOI 10.1109/VR46266.2020.00-57, pp. 275-284.

Kwon et al., Predicting Future Frames using Retrospective Cycle GAN, IEEE Xplore 2019, pp. 1811-1820.

Vondrick et al., Generating Videos with Scene Dynamics, 29th Conference on Neural Information Processing Systems (NIPS 2016), Barcelona, Spain, arXiv:1609.02612v3 [cs.CV] Oct. 26, 2016, pp. 1-10.

* cited by examiner

CREATING A VIRTUAL OBJECT RESPONSE TO A USER INPUT

BACKGROUND

Mobile device users may interact with virtual objects in a virtual environment via a software application running on the mobile device. For example, virtual-based software applications such as virtual reality (VR), augmented reality (AR), and mixed reality (MR), enable users to interact with virtual objects in a virtual environment. The border between the virtual environment and a real world environment continues to dissolve, providing experiences that, a short time ago, could only be found in the imagination of science fiction.

As an example, augmented reality provides an enhanced version of reality that is created by adding digital information to an image of the real world. Here, an augmented reality application may add digital elements (objects, overlays, etc.) to a live image view. Meanwhile, virtual reality (VR) uses computer technology to create a simulated environment." Virtual reality typically includes a complete immersion into the virtual world that shuts out the physical world. Virtual reality may be artificial, such as an animated scene, or an actual place that has been photographed and included in a virtual reality application. In virtual reality, a user can move around and look in every direction as if the user was physically present in the virtual location. Mixed Reality (MR) combines elements of both augmented and virtual reality and typically includes real-world objects and digital objects that interact with one another.

One of the drawbacks of software applications that enable users to interact with virtual objects is that when a user interacts with a virtual object, the response (e.g., movement) of the virtual object as a result of the user interaction is limited. In most cases, the software application is pre-programmed with specific response movements of the virtual object when interacted with by a user. For example, a user may use their finger to swing a bat at a baseball causing the baseball to be hit by the bat. In response, the baseball may move in a handful of pre-programmed directions that are predefined and hardcoded within the application. These responses are not very realistic because a ball may move in an unlimited amount of directions off of the bat. Furthermore, many user interactions (e.g., blowing of air, clapping of hands, whistling, shouting, etc.) are not capable of being used as input means to move a virtual object because such user interactions are not recognized as valid inputs.

SUMMARY

One example embodiment provides an apparatus that includes a memory configured to store a machine learning model, and a processor configured to one or more of receive a measurement of an external input of a user with respect to a virtual object displayed in virtual space, predict, via execution of the machine learning model, a movement of the virtual object in the virtual space in response to the external input of the user based on the measurement of the external input of the user, and move the virtual object in the virtual space based on the predicted movement of the virtual object by the machine learning model.

Another example embodiment provides a method that includes one or more of receiving a measurement of an external input of a user with respect to a virtual object displayed in virtual space, predicting, via execution of a machine learning model, a movement of the virtual object in the virtual space in response to the external input of the user based on the measurement of the external input of the user, and moving the virtual object in the virtual space based on the predicted movement of the virtual object by the machine learning model.

A further example embodiment provides a non-transitory computer-readable medium comprising instructions, that when read by a processor, cause the processor to perform one or more of receiving a measurement of an external input of a user with respect to a virtual object in virtual space, predicting, via execution of a machine learning model, a movement of the virtual object in the virtual space in response to the external input of the user based on the measurement of the external input of the user, and moving the virtual object in the virtual space based on the predicted movement of the virtual object by the machine learning model.

DETAILED DESCRIPTION

It will be readily understood that the instant components, as generally described and illustrated in the figures herein, may be arranged and designed in a wide variety of different configurations. Thus, the following detailed description of the embodiments of at least one of a method, apparatus, non-transitory computer readable medium and system, as represented in the attached figures, is not intended to limit the scope of the application as claimed but is merely representative of selected embodiments.

The instant features, structures, or characteristics as described throughout this specification may be combined or removed in any suitable manner in one or more embodiments. For example, the usage of the phrases "example embodiments", "some embodiments", or other similar language, throughout this specification refers to the fact that a particular feature, structure, or characteristic described in connection with the embodiment may be included in at least one embodiment. Thus, appearances of the phrases "example embodiments", "in some embodiments", "in other embodiments", or other similar language, throughout this specification do not necessarily all refer to the same group of embodiments, and the described features, structures, or characteristics may be combined or removed in any suitable manner in one or more embodiments. Further, in the diagrams, any connection between elements can permit one-way and/or two-way communication even if the depicted connection is a one-way or two-way arrow. Also, any device depicted in the drawings can be a different device. For example, if a mobile device is shown sending information, a wired device could also be used to send the information.

In addition, while the term "message" may have been used in the description of embodiments, the application may be applied to many types of networks and data. Furthermore, while certain types of connections, messages, and signaling may be depicted in exemplary embodiments, the application is not limited to a certain type of connection, message, and signaling.

Example embodiments provide methods, systems, components, non-transitory computer-readable media, devices, and/or networks, which are directed to predicting natural responses (movements) of virtual objects in response to an external stimulus supplied by a user. The system described herein may be incorporated into a virtual software application (e.g., virtual reality, augmented reality, mixed reality, etc.) and may be used to predict a location of the virtual object in a next image frame (or frames) of the virtual software application. Furthermore, the system may move the virtual object within the next image frame based on the prediction thereby creating a more lifelike response movement of the virtual object in response to external stimulus provided by a user input.

Virtual-based software applications such as virtual reality, augmented reality, and mixed reality have garnered interest in gaming, social media, medical applications, and the like. As an example, a mixed reality application may use multiple sensors, advanced optics, and holographic processing to create movement of virtual objects. The holograms can be used to display information, blend with the real world, or even simulate a virtual world. However, one of the problems with existing mixed reality techniques is that the focus is only on the hand gestures of the users that interact with the objects in the virtual environment. It does not take other user stimulus as an input means, for example, blowing, clapping, whistling, light, shouting, etc. Moreover, the response of the virtual object is unnatural because it is limited to a few possible directions, which are preprogrammed into the software application.

Meanwhile, a generative adversarial network (GAN) can be used to predict image frames in video. For example, a GAN can be used to predict a next frame of video based on a current frame of video. However, one of the problems with existing GAN architectures is that a user's stimulus to an image/video is not considered for predicting the next frame/response. Instead, existing GANs predict the next frame of video based on the image content in past video frames without receiving any external stimulus from a user like touch, sound, air pressure, light, clapping, etc.

The example embodiments address these drawbacks in the art by providing a system and a method to generate (e.g., predict, determine, generate, etc.) a next frame of a virtual video/image based on an external input by a user with respect to a virtual object displayed in the virtual environment. Here, the external input by the user may be referred to as a "stimulus". The system may predict a movement of the virtual object in virtual space in response to the stimulus thereby providing the user with a more natural experience of interacting with the objects in the virtual world multiple types of natural interaction modes like touch, blow, sound, light, etc.

In addition, the example embodiments also enable different interaction types/modes to be used when interacting with virtual objects in virtual space that have not previously been available. For example, inputs such as blowing air, shouting, clapping, whistling, touching (with hands), dragging, dropping, and the like, may be used to move virtual objects in a virtual environment of the virtual software application. Here, the machine learning model (or models) may be trained based on different interaction modes. Thus, the machine learning model may be able to determine a natural response of a virtual object in response to a user interaction such as listed above, and move the virtual object in a subsequent image frame.

Some of the benefits of the example embodiments include improving the way that a virtual object responds to user interaction within the virtual world by enabling a more realistic response from the virtual object. In particular, the response of the virtual object may be unlimited in possible direction and force, in comparison to conventional virtual software in which a virtual object response is preprogrammed and only includes a limited amount of directions. Furthermore, new types of user interaction (e.g., blowing on objects, dragging objects, pushing objects, shouting at objects, and the like) may be used to move virtual objects in a virtual environment thereby improving the user experience and the ability of the software to response to real-life user interactions.

Generative adversarial networks (GANs) have shown promising results in generating new plausible samples and next frame prediction, especially in the tasks of image generation and video generation. GANs may include a generative model that is generated by framing a problem to be solved as a supervised learning problem with two sub-models: a generator model that may be trained to generate new examples, and a discriminator model that tries to classify examples as either real (from the domain) or fake (generated). The two models are trained together in a zero-sum game, adversarial, until the discriminator model is fooled a predetermined amount of time (e.g., about half of the time), meaning the generator model is generating plausible examples.

In the example embodiments, the machine learning model that may be used to predict the next image frame (and the movement of the virtual object in response to the external user input) may be performed using a GAN, such as a CycleGAN, although embodiments are not limited thereto as any kind of GAN can be used. The GAN may include a convolutional neural network (CNN) layer that predicts coordinate locations (e.g., a bounding box around the virtual object) of the virtual object in response to the external input by the user. Furthermore, the GAN may be used to refine the location of the virtual object determined by the CNN based on cause/effect image analysis to generate the next image frame in which the virtual object has moved as a result of the external input by the user.

Image-to-image translation typically involves generating a new synthetic version of a given image with a specific modification, such as additional image details being added to the image to create the synthetic image. Training a model for image-to-image translation may require a large dataset of paired examples. These datasets can be difficult and expensive to prepare. The CycleGAN is a technique that involves the automatic training of image-to-image translation models without paired examples. The models may be trained using a collection of images from the source and target domain that do not need to be related.

The GAN architecture includes a generator model and a discriminator model. The generator takes a point from a latent space as input and generates new plausible images from the domain, and the discriminator takes an image as input and predicts whether it is real (from a dataset) or fake (generated). Both models are trained in a game, such that the generator is updated to better fool the discriminator and the discriminator is updated to better detect generated images. The CycleGAN is an extension of the GAN architecture that involves the simultaneous training of two generator models and two discriminator models. Here, one generator takes images from the first domain as input and outputs images for the second domain, and the other generator takes images from the second domain as input and generates images for the first domain. Discriminator models are then used to determine how plausible the generated images are and update the generator models accordingly.

This extension alone might be enough to generate plausible images in each domain, but not sufficient to generate translations of the input images. The CycleGAN uses an additional extension to the architecture called cycle consistency. Here, an image output by the first generator could be used as input to the second generator and the output of the second generator should match the original image. The reverse is also true. For example, an output from the second generator can be fed as input to the first generator and the result should match the input to the second generator. Cycle consistency is a concept from machine translation where a phrase translated from one language to another should translate back to the original phrase in a reverse process.

In the example embodiments, the CycleGAN model may be used to generate various responses of the virtual object based on natural user interaction modes. This involves the automatic training of image-to-image translation models without paired examples. The models are trained in an unsupervised manner using a collection of images from the source and target domain that do not need to be related in any way. This simple technique is powerful, achieving visually impressive results on a range of application domains.

Figure 1A:
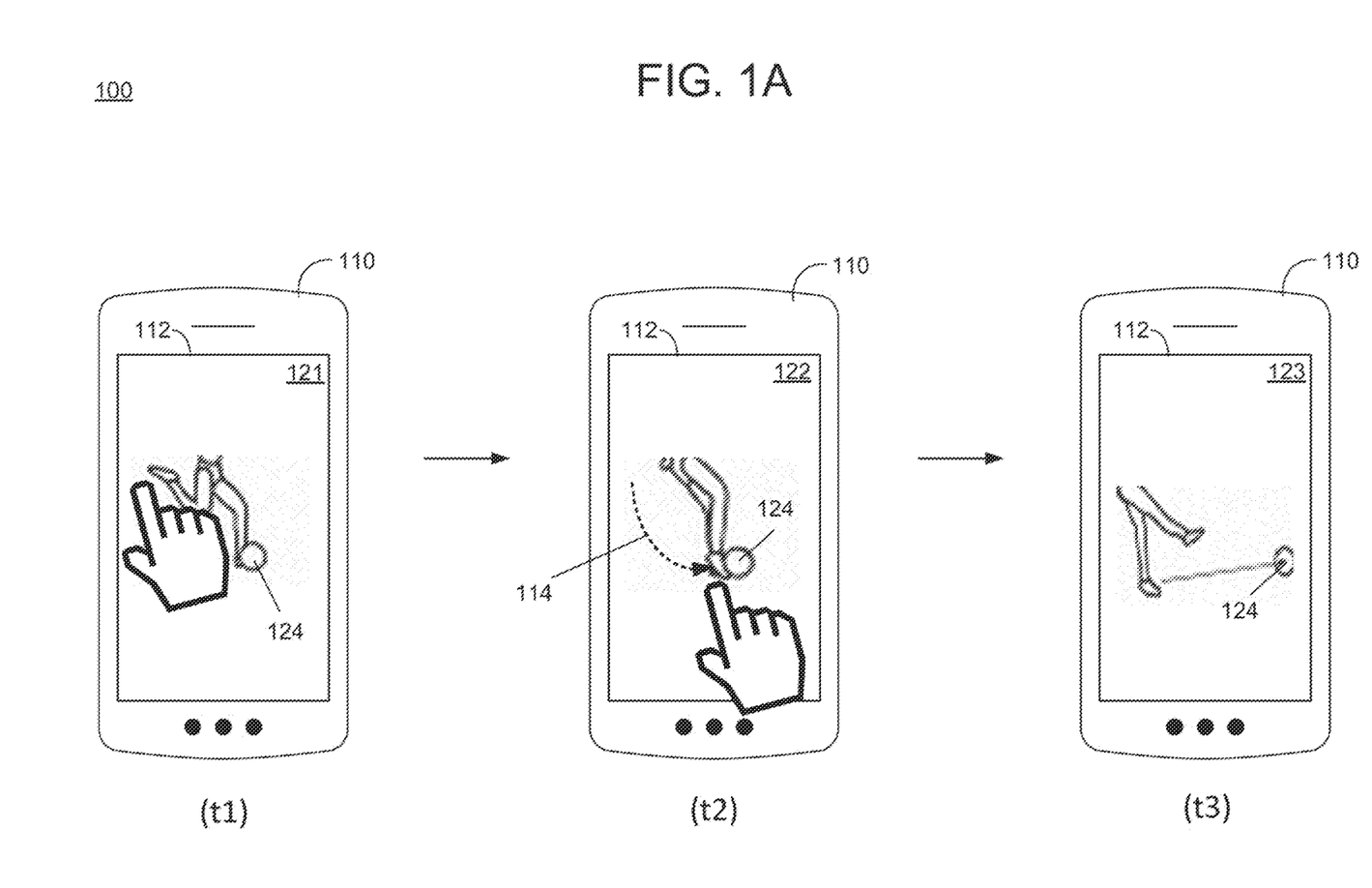
FIGS. 1A-1C are diagrams illustrating processes of moving a virtual object in response to external stimulus from a user according to example embodiments.
Figure 1B:
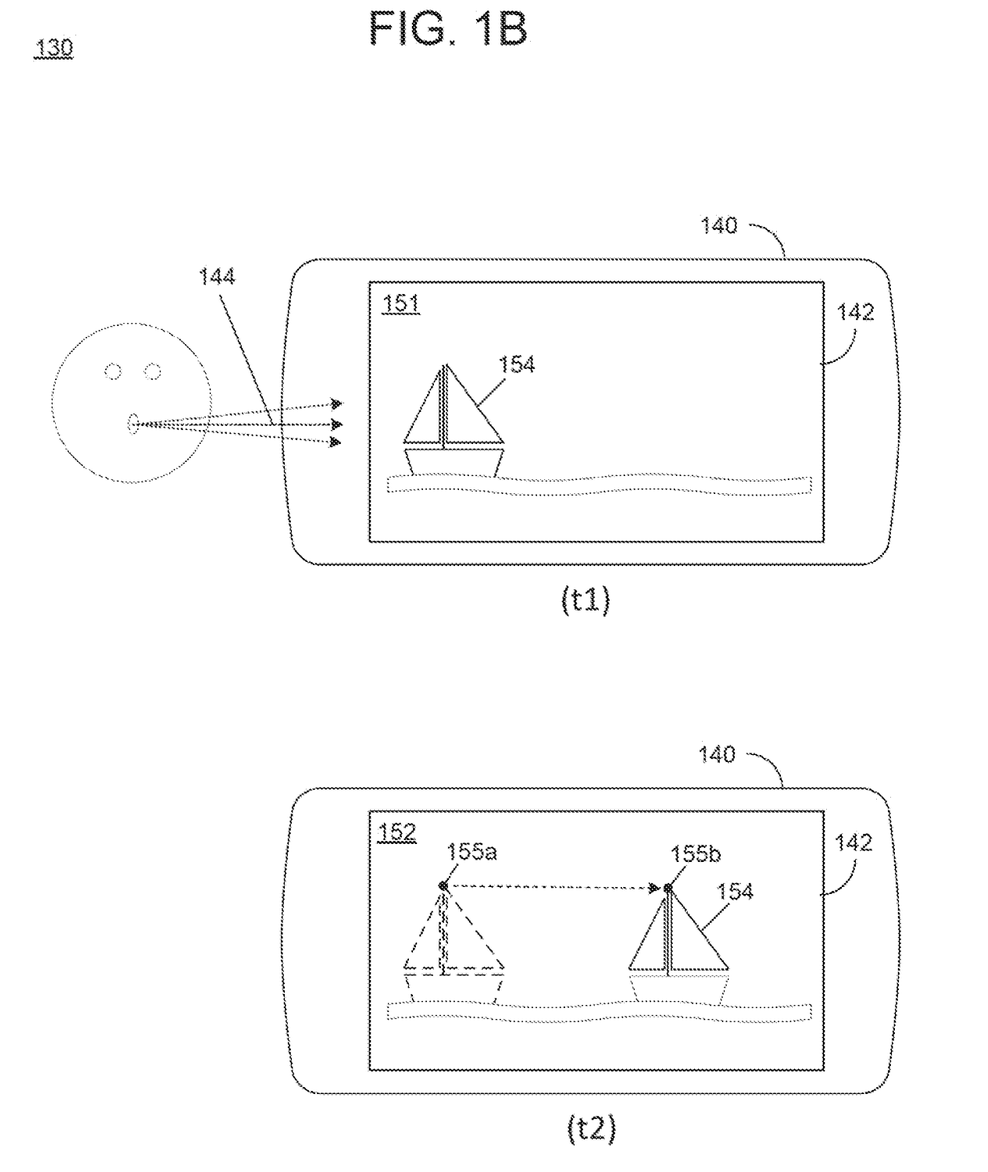
Figure 1C:
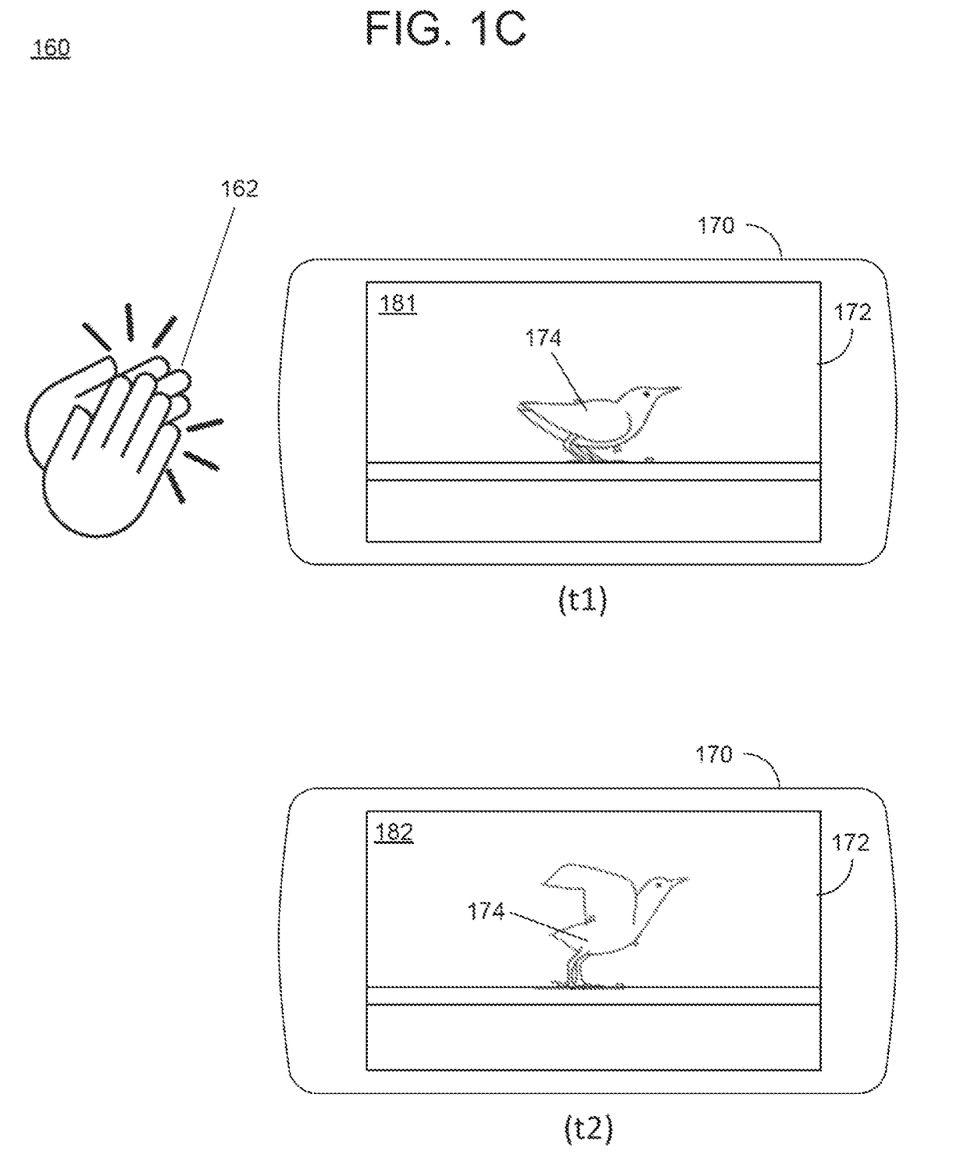

FIGS. 1A-1C illustrate processes of moving a virtual object in response to external stimulus from a user according to example embodiments. In the examples herein, the virtual object is displayed within a virtual application such as an augmented reality application, a virtual reality application, a mixed reality application, or the like. The machine learning may be integrated into the application itself. In the example where the application is a web-based application, the machine learning may be performed by either a front-end of the application on a client device and/or a back-end of the application on a host device such as a web server, cloud platform, database, etc. As another example, the machine learning model may be integrated within a service that is called by the virtual application. For example, both the virtual application and the service may be hosted on a same host platform.

Referring to FIG. 1A, a process 100 of a virtual application moving a virtual object 124 in response to an external stimulus supplied by a user. In this example, a sequence of images 121, 122, and 123 of the virtual application are shown while a user is using their finger to touch a touch screen 112 of a mobile device 110 to move a virtual object 124.

The virtual object 124 is a ball that the user is kicking using a virtual player (e.g., a leg of a virtual player). The images 121, 122, and 123 are each shown in sequential order, one after the other. Thus, the image 121 is shown first, the image 122 is shown second, and the image 123 is shown third. While viewing the image 121, the user initiates a touch action on the touch screen 112 which is sensed by a touch screen sensor (not shown). In the image 122, the user inputs a touch command 114 causing the virtual player's leg to move towards the virtual object 124. In the image 123 (e.g., the next subsequent image with respect to image 122), the software application responds by moving the virtual object 124 in response to the touch command 114 on the touch screen 112 as shown by the movement of the virtual object 124 in the image 123 with respect to the image 122. In this example, the external stimulus applied by the user is the touch command 114 on the touch screen 112.

In response to the external stimulus (the touch command 114), the virtual application may move the virtual object 124. Here, the movement (position of the virtual object 124) in response to the touch command 114 may be determined by a machine learning model which may be used to generate the image 123. In particular, the machine learning model can be used to determine a location of the virtual object 124 in the image 123 as a result of the touch command 114 performed on the virtual object 124 in the image 122. That is, commands entered within a current image frame can be used to predict a movement of a virtual object in a next, subsequent frame.

FIG. 1B illustrates a process 130 of a user inputting a blow command 144 towards a user interface 142 of a user device 140, such as a tablet, a mobile phone, or the like. That is, the external stimulus in this example is a user blowing air at the user device 140. Here, a sensor of the user device 140 may be used to measure the air flow, pressure, velocity, etc., of the blow command 144 of the user.

In response to the blow command 144, the virtual application may move a virtual object 154 (i.e., a sailboat) within a virtual environment of the virtual application being displayed on the user device 140. In this example, an image 151 is shown with the virtual object 154 positioned on a left-side of the user interface 142. In response to the blow command 144, the virtual application may move the virtual object 154 from a position 155a to a position 155b as shown in image 152. In this case, the position of the virtual object has moved toward the right-side of the user interface 142 as a result of the blow command 144 from the user.

FIG. 1C illustrates a process 160 of a user interacting with a virtual object 174 using a clapping command 162 as an input. In this example, a user is viewing the virtual object 174 (e.g., a bird) within an image 181 of a virtual application that is being played via a user interface 172 of a user device 170. Here, a sensor (e.g., a microphone or other sensor) of the user device 170 may detect the clapping command 162, for example, by measuring decibels, etc. In response to the clapping command, the virtual application may move the virtual object 174 as shown in image 182. Here, the virtual object 174 begins to fly away from the branch as a result of the clapping command 162.

According to various embodiments, different types of interactions/interaction modes of a user may be used to move virtual objects in virtual space due to the use of the machine learning model. For example, the machine learning model can be trained from historical images of objects being moved as a result of a person blowing on them. Here, the machine learning model may be trained on both sensor measurements (of the blowing) and images of the object as it moves in response to the blowing. However, the machine learning model does not need to be trained on sailboats being moved as a result of blowing, but rather any type of object.

Also, the machine learning model may be trained to move virtual objects based on other types of user interactions/ external stimulus such as clapping hands, shouting, whistling, talking, touching virtual objects, and the like. As further described below, the type of interaction may be used by the machine learning model when generating the prediction.

Figure 2:
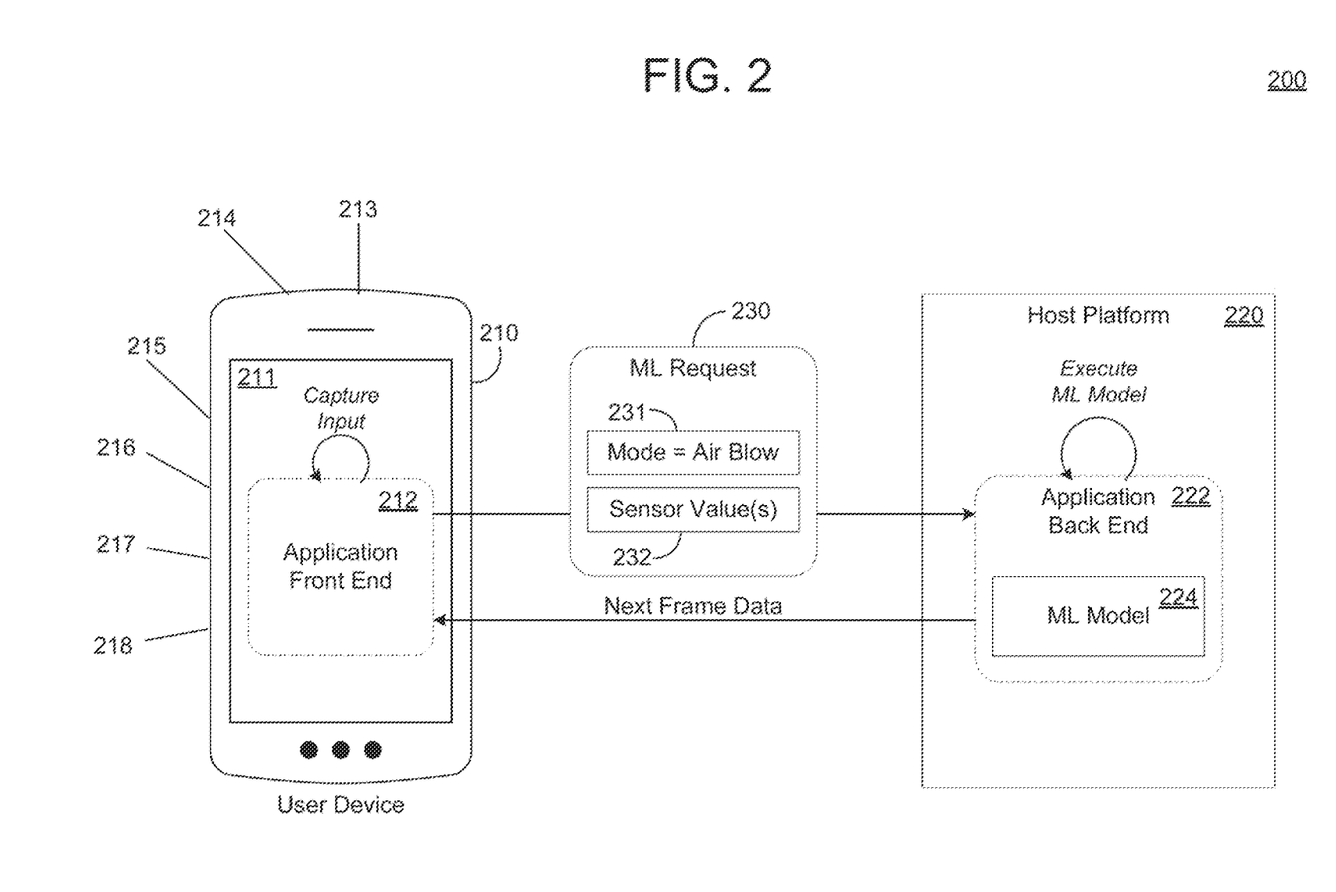
FIG. 2 is a diagram illustrating a process of detecting a user input and forwarding the user input to a machine learning model according to example embodiments.

FIG. 2 illustrates a process 200 of detecting a user input and forwarding the user input to a machine learning model according to example embodiments. In some embodiments, the machine learning model described herein may be one large model that is trained to make predictions on the movement of a virtual object in response to all different types of user interactions (e.g., blowing, touching, sound, clapping, etc.) As another example, a plurality of different machine learning models may be used, where each model is designed for use with a different type of user interaction mode. For example, a first machine learning model may be built to predict a response based on blowing sound while a second machine learning model may be built to predict a response based on clapping, etc.

In the example of FIG. 2, a software application includes an application front-end 212 or client side and an application back-end 222 or server side. Here, the application back-end 222 may include a machine learning model 224 for predicting a response of the virtual object in response to user input commands and interactions via the application front-end 212, but embodiments are not limited thereto. In some embodiments, the machine learning model 224 may be implemented within the application front-end 212. As another example, the application may be a stand-alone application that is not hosted by a host platform 220, but rather resides locally on the user device 210. In this example, the machine learning model 224 will also be hosted on the user device 210.

Referring to FIG. 2, the user device 210 such as a smart phone has a number of different sensors such as a touch screen sensor 211, an accelerometer 213, a gyroscope 214, a microphone 215, an ambient light sensor 216, a proximity sensor 217, a spirometer 218, and the like. Each sensor may be used to sense different types of data about user interactions and external stimulus. When a user input is received, the user device 210 may read the input (e.g., via one or more of the sensors) and transmit the reading to the host platform 220 via a request 230. Here, the request 230 may be a message that includes a field 231 with a value for the type of interaction mode and a field 232 with a value for the sensor reading or readings. Thus, the user device 210 may supply the machine learning model 224 with both the type of interaction mode (e.g., 1=blow, 2=whistle, 3=clap, 4=scream, 5=touch, etc.) and the measured value of the interaction with respect to the user device 210.

In response to receiving the request 230, the machine learning model 224 may be executed to predict a movement of the virtual object in response to the interaction data values included in the request 230. Furthermore, the virtual application may control a movement of the virtual object within the application front-end 212 thereby moving the virtual object in response to the interaction by the user.

Figure 3:
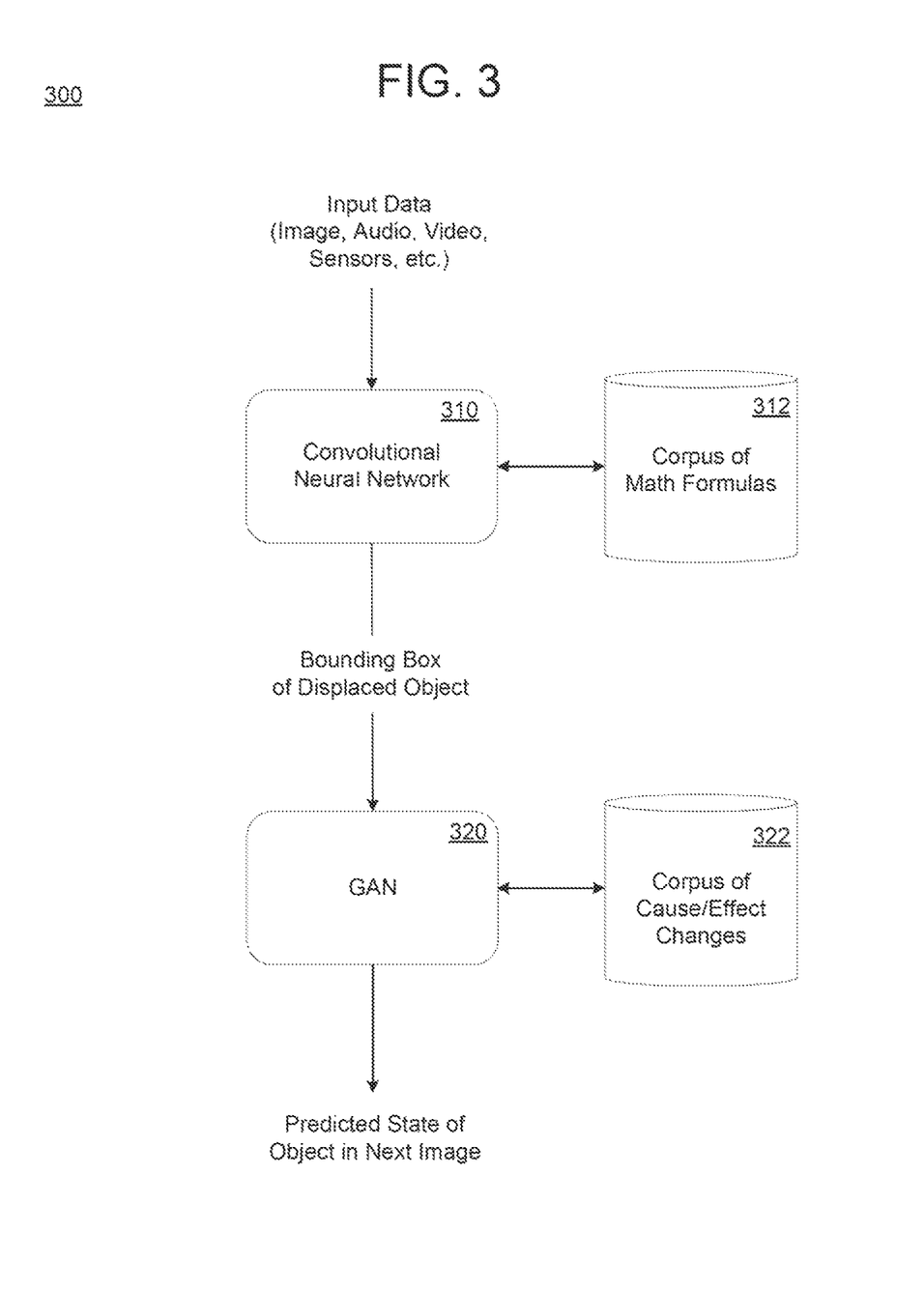
FIG. 3 is a diagram illustrating an example of a machine learning model for predicting a response of a virtual object according to example embodiments.

FIG. 3 illustrates an example of a machine learning model 300 for predicting a response of a virtual object according to example embodiments. Referring to FIG. 3, the machine learning model 300 may include a convolutional neural network (CNN) layer 310 and a generative adversarial network (GAN) 320. As one example, the GAN 320 may be a CycleGAN, but embodiments are not limited thereto.

In live operation, the machine learning model 300 may receive sensor data measured by sensors of a mobile device. Here, the sensor data may include a sensor reading that captures a user interaction with respect to a virtual object in virtual space. The user interaction may be a touch input on a touch screen, a sound input (e.g., whistling, shouting, etc.), a clapping input, a light-based input, and the like. The CNN layer 310 may identify an approximate location (e.g., a bounding box) of the virtual object before and after the external user input is supplied and provide both of these approximate locations to the GAN 320. In other words, the CNN layer 310 can predict a bounding box location (e.g., bounding box coordinates) of the virtual object as a result of being displaced by the external input from the user. The displaced location may be a location of the virtual object after being moved as a result of the external input. Meanwhile, the GAN 320 may predict a state of the virtual object in a next image. Here, the predicted state may be based off of the bounding box location provided by the CNN layer 310.

For example, smart device sensors embedded inside a mobile device may be used to harvest data associated with the external input of a user with respect to a virtual object displayed on the screen based on the user's interaction mode. The sensors may identify parameters of the external input including a type of user interaction mode (e.g., sound, air blow, light, touch, etc.) Furthermore, the sensors may measure a force or other parameter value caused by the user interaction such as the decibels of the sound, the velocity of the air blow, the amount of light captured, the pressure, force, proximity, etc. of a touch, pull, drag, etc. on the touch screen, and the like.

In FIG. 3, the GAN 320 may be used to generate various responses of the virtual object based on natural user interaction modes. This involves the automatic training of image-to-image translation models without paired examples. For example, one or more machine learning models may be trained in an unsupervised manner using a collection of images 322 from a source and a target domain that do not need to be related in any way. This simple technique is powerful, achieving visually impressive results on a range of application domains. In the example embodiments, the GAN 320 may be a CyclicGAN model trained on an historical corpus of cause-and-effect changes in various images/videos based on the user's action (e.g., tapping, pulling, dragging, blowing air, pushing, etc.)

Meanwhile, the CNN layer 310 may be trained with a corpus of math formulas 312 containing various mathematical, physical, chemical properties of the virtual objects along with the respective formula. This is used to identify the bounding boxes around the targeted objects at a time t=0 (before the external user input) and at time t=1 (after the external input). When a user tries to interact with the virtual object (image/video), a sensor embedded in the mobile device may capture the corresponding data and the type of user interaction mode. The information from the sensor is fed to the CNN layer 310 and then to the trained GAN 320 which identifies the cause and the corresponding effect of the virtual object based on the historical and the knowledge corpus that it is trained on.

Here, the virtual application may move the virtual object in a next image frame based on the output of the GAN 320. In response, the user will experience the effect/response of the virtual objects based on their interaction mode. In this case, the response from the virtual object may be unlimited in direction and distance in contrast to a traditional virtual software application where the response of a virtual object to external stimulus is preprogrammed and typically only allows for a handful of possible response directions and distances.

Figure 4:
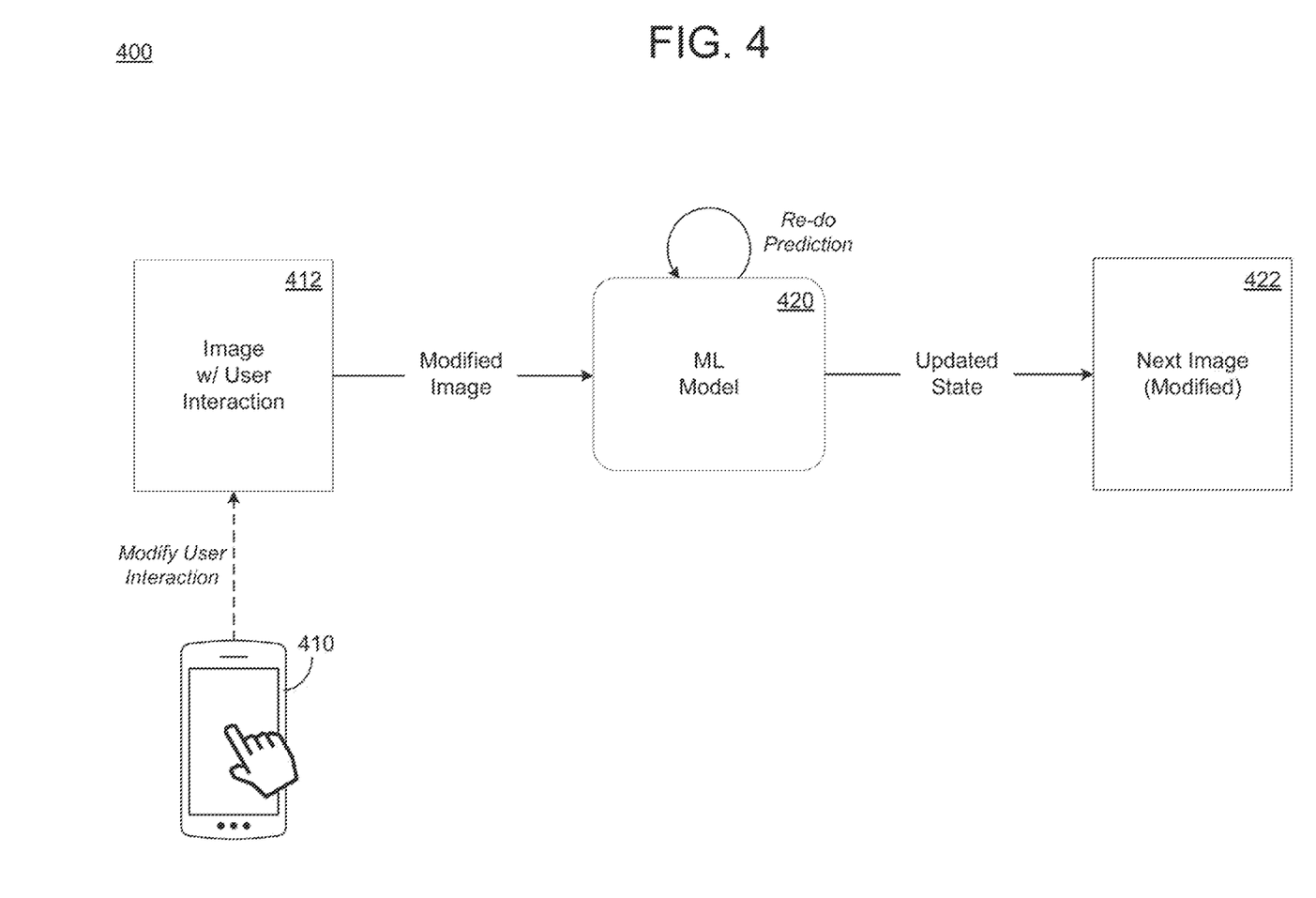
FIG. 4 is a diagram illustrating a process of modifying a user interaction with respect to a virtual object and re-predicting a response movement of the virtual object according to example embodiments.

Furthermore, referring to FIG. 4, when a CycleGAN model is used, the model can also perform a process 400 to predict the previous state of an object where given an image and the possible interaction mode that caused the current state of an image, the user can be given an option to remove any of the given interaction modes to observe what could be the previous state of the same object in an image. This will not be same as the input to the previous stage.

As an example, a user may interact with an image using his hand gesture to observe the motion of a virtual object thrown or projected into the air, subject to only the acceleration of gravity (projectile motion). In this example, sensors embedded in a user device where the user is interacting with the virtual object may identify the type of user interaction mode as "touch" and the corresponding physical measurement of the interaction on the touchscreen (e.g., angle and the velocity at which the object is thrown).

In this example, the GAN may be trained on a historical corpus of cause-and-effect changes in various images/videos based on user's action. The information from the sensor may be fed to the trained GAN model which identifies the cause and the corresponding effect of the virtual object based on the historical and the knowledge corpus that it is trained on. Thus, the GAN model is already trained on a projectile motion database to find the displacement of the virtual object in response to the touch input on the screen.

In an example, the GAN may be a CycleGAN which has two sets of generators and discriminators which are trained simultaneously. In particular, one generator model takes the input of a current state of the virtual object and outputs the next state of the virtual object based on the additional user interaction on the current state of the virtual object. The other generator may take the received input of the current state of the virtual object and output the previous state of the virtual object based on the removal of the existing user interaction from the current state of the virtual object. The generator functions are shown below.

i. Generator 1 I/P: Current State of the object
ii. Generator 1 O/P: Next State of the object
iii. Generator 2 I/P: Current State of the object
iv. Generator 2 O/P: Previous State of the object The corresponding discriminator models are then used to determine how realistic the generated images/videos are in terms of the universal mathematical formula and update the generator models accordingly. The CycleGAN may use an additional extension to the architecture called cycle consistency. In this case, the output by the first generator which is the next state of the object could be used as input to the second generator and the output of the second generator should match the original current state of the object. The reverse is also true. For example, an output from the second generator can be fed as input to the first generator and the result should match the input to the second generator.

Additional cycle consistency loss is added to measure the difference between the generated output of the second generator and the original video, and the reverse. This acts as a regularization of the generator models. In this case, the inputs to both of the generator models are the current state of the virtual object and the user interaction which could be used to generate the realistic effect on the virtual object based on the cause using the existing historical corpus on the cause-and-effect relationship. The inputs to the discriminator are the generated virtual object along with the available user interaction, the actual ground truth image/video of virtual objects with and without their mapped object responses to the triggers to ensure that the discriminator learns to specifically check for the high quality and realistic effect on the cause and not just the image quality.

In some embodiments, the generator model may be trained to generate the effect on a virtual object conditioned on the user interaction, and the discriminator model may classify the generated output as either real (the cause and effect are in sync) or fake (the cause and effect are out of sync). The two models are trained together in a zero-sum game, adversarial, until the discriminator model is fooled a predetermined amount of time, for example, about half the time, meaning the generator model is generating plausible examples. After the completion of the training process, the fake outputs are ignored and only the outputs that are classified as real by the discriminator are displayed. The GAN may determine the displacement of the virtual object on which the user interacted and generate a realistic output of the same object displaced as per the universal projectile motion and a vector formula.

FIG. 4 illustrates a process 400 of modifying a user interaction with respect to a virtual object and re-predicting a response movement of the virtual object according to example embodiments. Referring to FIG. 4, a user may use a mobile device 410 (e.g., which is displaying a user interface, menu, etc.) to input changes to the external input, after-the-fact. For example, the user may input a change to reduce a force, change a direction, add force, etc., to the virtual object to create a modified image 412. The modified image 412 may be fed into a machine learning model 420, such as the machine learning model 300 shown in FIG. 3. Here, the machine learning model 420 may predict a movement of the virtual object based on the modified image 412 to generate a next image 422. Thus, a user can view what would happen to the virtual object if the user's interaction had been changed in some way. For example, the user may change an input in some way or remove an input in some way and see what the resulting effect would have been on the virtual object.

Here, because the machine learning model 420 is using a GAN (e.g., a CycleGAN), the machine learning model 420 can also predict the previous state of an object where given an image and the possible interaction mode that caused the current state of an image, the user can be given an option to remove any of the given interaction modes to observe what could be the previous state of the same object in an image. For example, when the user removes the specific user interaction like velocity and angle of the displaced object of the above image, the model could generate the previous state of the same object. Similarly, the model can generate various realistic responses of the virtual object based on the user interaction mode and corresponding interaction metric. For example, a resting bird in an image may fly away when the user provides a sound beyond a certain decibel, a sleeping kitten wakes up when the user hits or taps on a screen with a certain velocity, or the like.

Figure 5:
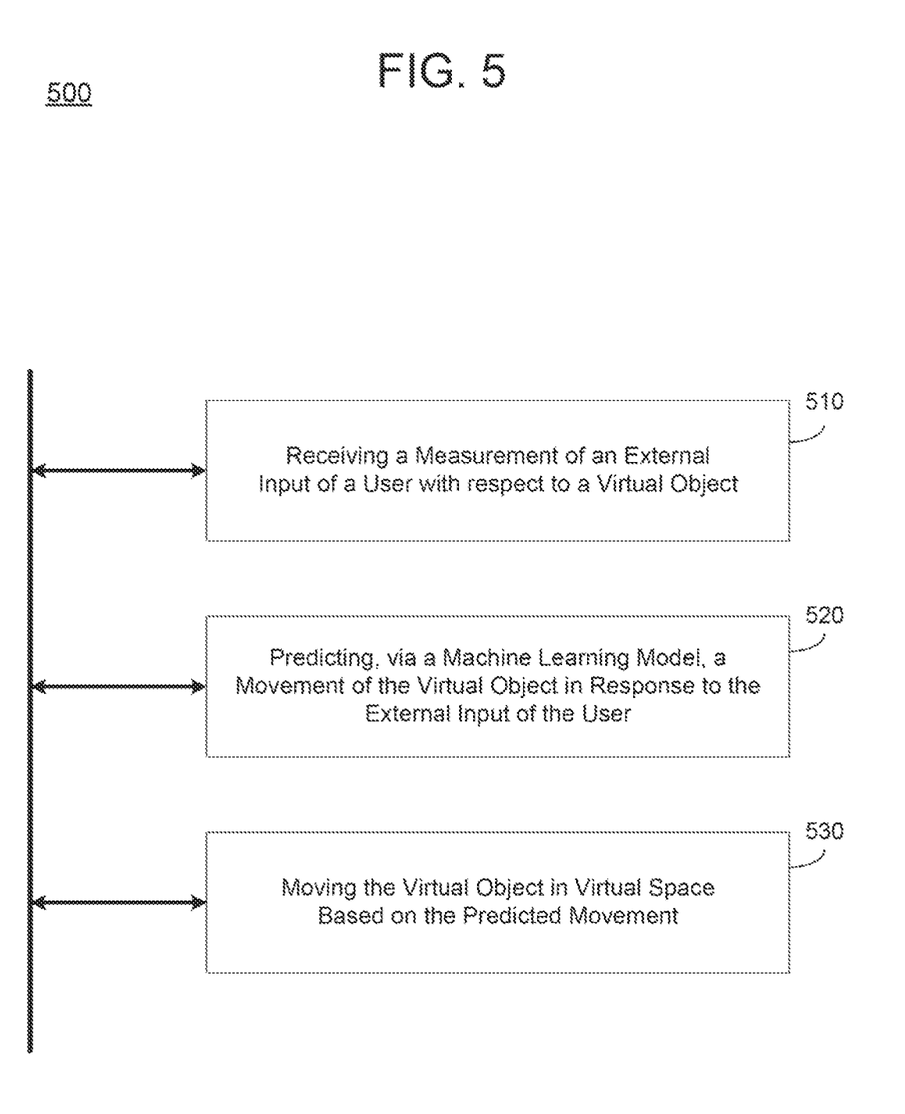
FIG. 5 is a diagram illustrating a method of predicting a response of a virtual object according to example embodiments.

FIG. 5 illustrates a method 500 of predicting a response of a virtual object according to example embodiments. For example, the method 500 may be performed by a host platform such as a cloud platform, a web server, a database node, a distributed computing system, a user device, a software application, a combination thereof, and the like. Referring to FIG. 5, in 510, the method may include receiving a measurement of an external input of a user with respect to a virtual object displayed in virtual space. The external input may include an external stimulus such as a finger touching a touch screen, a person blowing on a screen, a clapping gesture, a shout, a whistle, a touching action, etc.

In 520, the method may include predicting, via execution of a machine learning model, a movement of the virtual object in the virtual space in response to the external input of the user based on the measurement of the external input of the user. In 530, the method may include moving the virtual object in the virtual space based on the predicted movement of the virtual object by the machine learning model. Although not limited thereto, in some embodiments, the machine learning model may be a GAN, such as a CycleGAN that includes a CNN layer.

In some embodiments, the receiving may include receiving the external input with respect to a current image of the virtual space, and the predicting comprises predicting the movement of the virtual object in a subsequent image of the virtual space. In some embodiments, the receiving may further include determining a type of user interaction of the external input from a plurality of different possible types of the user interactions (e.g., clapping, blowing, touching, etc.), and the predicting further comprises predicting the movement of the virtual object in virtual space based on the determined type of the user interaction. In some embodiments, the receiving may include receiving a touch input on a touch screen, and the predicting comprises predicting the movement of the virtual object in virtual space based on a pressure value and a distance of movement of the touch input on the touch screen.

In some embodiments, the receiving may include receiving one or more inputs from among audio of user speech, audio of a user clapping hands, and air pressure of a user blowing air, and the predicting further comprises predicting the movement of the virtual object in virtual space based on the one or more inputs. In some embodiments, the predicting may include determining a value of force and a direction of the force created by the user interaction on the virtual object in the virtual space, and predicting the movement of the virtual object in virtual space based on the value of the force and the direction of the force. In some embodiments, the machine learning model is trained based on at least one of previously recorded images and previously recorded videos of a physical object that moves in physical space in response to user stimulus, where the physical object corresponds to the virtual object.

In some embodiments, the machine learning model may include a convolutional neural network (CNN) layer configured to identify a bounding box corresponding to the virtual object after the external stimulus of the user created by the user interaction. In some embodiments, the machine learning model may further include a generative adversarial network (GAN) which receives the bounding box from the CNN and determines a location of the virtual object in virtual space based on the external stimulus of the user created by the user interaction and the bounding box.

Figure 6:
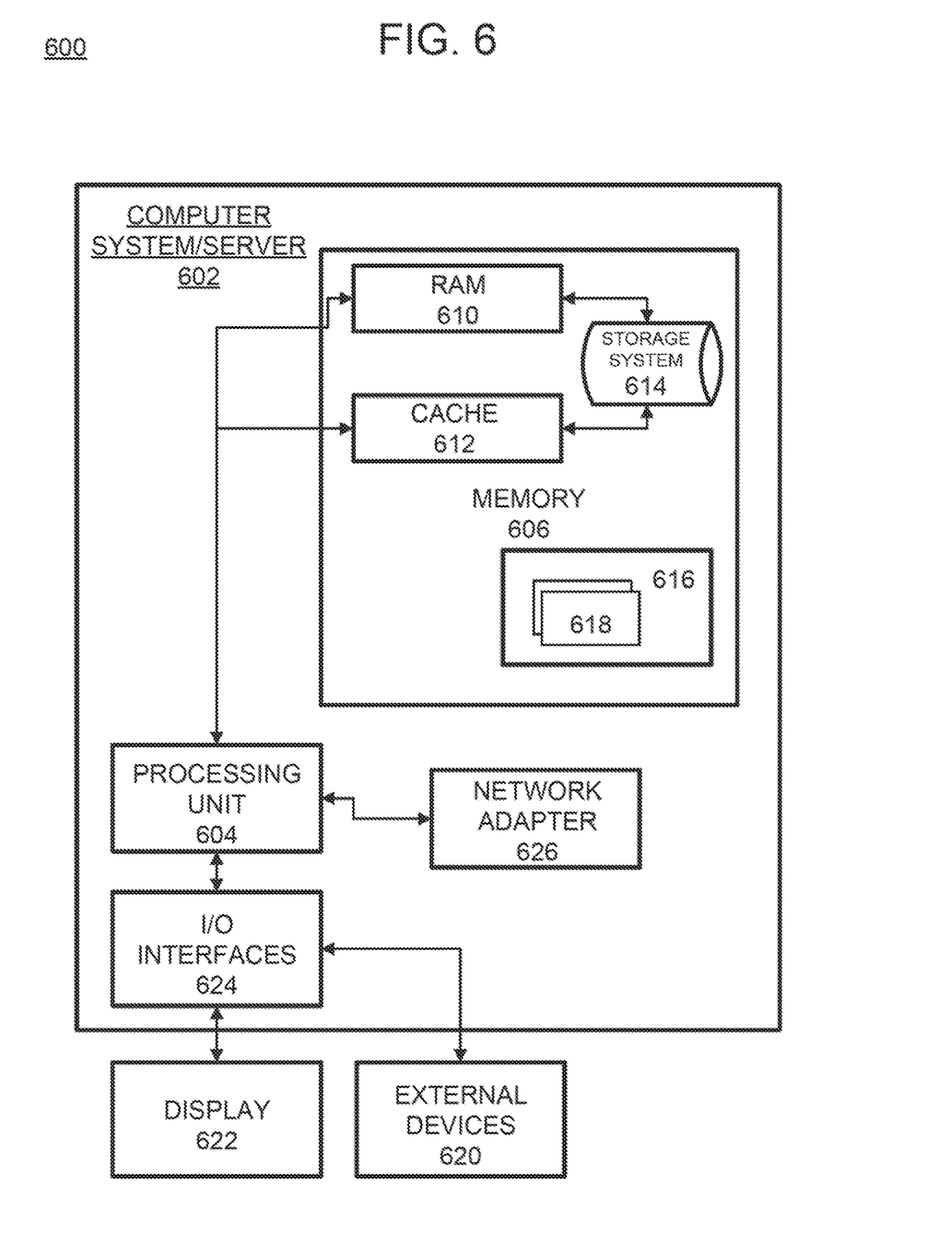
FIG. 6 is a diagram illustrating an example system that supports one or more of the example embodiments.

FIG. 6 illustrates an example system 600 that supports one or more of the example embodiments described and/or depicted herein. The system 600 comprises a computer system/server 602, which is operational with numerous other general purpose or special purpose computing system environments or configurations. Examples of well-known computing systems, environments, and/or configurations that may be suitable for use with computer system/server 602 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 602 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 602 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 6, computer system/server 602 in the system 600 is shown in the form of a general-purpose computing device. The components of computer system/server 602 may include, but are not limited to, one or more processors 604, a memory 606, and a bus that couples various system components including the memory 606 to the one or more processors 604.

The bus represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 602 typically includes a variety of computer system readable media. Such media may be any available media that is accessible by computer system/server 602, and it includes both volatile and non-volatile media, removable and non-removable media. Memory 606, in one embodiment, implements the flow diagrams of the other figures. The memory 606 can include computer system readable media in the form of volatile memory, such as random-access memory (RAM) 610 and/or cache memory 612. Computer system/server 602 may further include other removable/non-removable, volatile/non-volatile computer system storage media. By way of example only, storage system 614 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to the bus by one or more data media interfaces. As will be further depicted and described below, the memory 606 may include at least one program product having a set (e.g., at least one) of program modules that are configured to carry out the functions of various embodiments of the application.

Program/utility 616, having a set (at least one) of program modules 618, may be stored in the memory 606 by way of example, and not limitation, as well as an operating system, one or more application programs, other program modules, and program data. Each of the operating system, one or more application programs, other program modules, and program data or some combination thereof, may include an implementation of a networking environment. Program modules 618 generally carry out the functions and/or methodologies of various embodiments of the application as described herein.

As will be appreciated by one skilled in the art, aspects of the present application may be embodied as a system, method, or computer program product. Accordingly, aspects of the present application may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present application may take the form of a computer program product embodied in one or more computer readable medium(s) having computer readable program code embodied thereon.

Computer system/server 602 may also communicate with one or more external devices 620 such as a keyboard, a pointing device, a display 622, etc.; one or more devices that enable a user to interact with computer system/server 602; and/or any devices (e.g., network card, modem, etc.) that enable computer system/server 602 to communicate with one or more other computing devices. Such communication can occur via I/O interfaces 624. Still yet, computer system/server 602 can communicate with one or more networks such as a local area network (LAN), a general wide area network (WAN), and/or a public network (e.g., the Internet) via network adapter 626. As depicted, network adapter 626 communicates with the other components of computer system/server 602 via a bus. It should be understood that although not shown, other hardware and/or software components could be used in conjunction with computer system/server 602. Examples include, but are not limited to, microcode, device drivers, redundant processing units, external disk drive arrays, RAID systems, tape drives, and data archival storage systems, etc.

Although an exemplary embodiment of at least one of a system, method, and non-transitory computer-readable medium has been illustrated in the accompanied drawings and described in the foregoing detailed description, it will be understood that the application is not limited to the embodiments disclosed, but is capable of numerous rearrangements, modifications, and substitutions as set forth and defined by the following claims. For example, the capabilities of the system of the various figures can be performed by one or more of the modules or components described herein or in a distributed architecture and may include a transmitter, receiver or pair of both. For example, all or part of the functionality performed by the individual modules, may be performed by one or more of these modules. Further, the functionality described herein may be performed at various times and in relation to various events, internal or external to the modules or components. Also, the information sent between various modules can be sent between the modules via at least one of: a data network, the Internet, a voice network, an Internet Protocol network, a wireless device, a wired device and/or via plurality of protocols. Also, the messages sent or received by any of the modules may be sent or received directly and/or via one or more of the other modules.

One skilled in the art will appreciate that a "system" could be embodied as a personal computer, a server, a console, a personal digital assistant (PDA), a cell phone, a tablet computing device, a smartphone or any other suitable computing device, or combination of devices. Presenting the above-described functions as being performed by a "system" is not intended to limit the scope of the present application in any way but is intended to provide one example of many embodiments. Indeed, methods, systems and apparatuses disclosed herein may be implemented in localized and distributed forms consistent with computing technology.

It should be noted that some of the system features described in this specification have been presented as modules, in order to more particularly emphasize their implementation independence. For example, a module may be implemented as a hardware circuit comprising custom very large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, comprise one or more physical or logical blocks of computer instructions that may, for instance, be organized as an object, procedure, or function. Nevertheless, the executables of an identified module need not be physically located together but may comprise disparate instructions stored in different locations which, when joined logically together, comprise the module and achieve the stated purpose for the module. Further, modules may be stored on a computer-readable medium, which may be, for instance, a hard disk drive, flash device, random access memory (RAM), tape, or any other such medium used to store data.

Indeed, a module of executable code could be a single instruction, or many instructions, and may even be distributed over several different code segments, among different programs, and across several memory devices. Similarly, operational data may be identified and illustrated herein within modules and may be embodied in any suitable form and organized within any suitable type of data structure. The operational data may be collected as a single data set or may be distributed over different locations including over different storage devices, and may exist, at least partially, merely as electronic signals on a system or network.

It will be readily understood that the components of the application, as generally described and illustrated in the figures herein, may be arranged and designed in a wide variety of different configurations. Thus, the detailed description of the embodiments is not intended to limit the scope of the application as claimed but is merely representative of selected embodiments of the application.

One having ordinary skill in the art will readily understand that the above may be practiced with steps in a different order, and/or with hardware elements in configurations that are different than those which are disclosed. Therefore, although the application has been described based upon these preferred embodiments, it would be apparent to those of skill in the art that certain modifications, variations, and alternative constructions would be apparent.

While preferred embodiments of the present application have been described, it is to be understood that the embodiments described are illustrative only and the scope of the application is to be defined solely by the appended claims when considered with a full range of equivalents and modifications (e.g., protocols, hardware devices, software platforms etc.) thereto.

What is claimed is:

1. An apparatus comprising:
  a memory configured to store a machine-learning model; and
  a processor configured to:
    receive, via a sensor of the apparatus, an external input from a user to control a virtual object displayed in a virtual space by the apparatus;

send a message comprising an identification of a type of the external input and a value of the external input, as measured by the sensor, to a machine-learning model, wherein the machine-learning model comprises a convolutional neural network (CNN) layer and a generative adversarial network (GAN), identify by the CNN layer a first bounding box corresponding to an approximate location of the virtual object in a current image of the virtual space before the external input is applied and a second bounding box corresponding to a predicted location of the virtual object in a next image of the virtual space after the external input is applied, receive by the GAN the second bounding box from the CNN layer, predict a location of the virtual object in the next image based on the external input of the user and the second bounding box; and move the virtual object in the virtual space based on the predicted location of the virtual object in the next image.

2. The apparatus of claim 1, wherein the processor is configured to:
receive the external input with respect to a current image of the virtual space, and
wherein, when the processor predicts the movement of the virtual object, the processor is further configured to:
predict the movement of the virtual object in a subsequent image of the virtual space.

3. The apparatus of claim 1, wherein the processor is further configured to:
determine a type of a user interaction of the external input from a plurality of different possible types of the user interactions, and
wherein, when the processor predicts the movement of the virtual object, the processor is further configured to:
predict the movement of the virtual object based on the determined type of the user interaction.

4. The apparatus of claim 1, wherein the processor is configured to:
receive a touch input on a touch screen, and
wherein, when the processor predicts the movement of the virtual object, the processor is further configured to:
predict the movement of the virtual object based on a pressure value and a distance of movement of the touch input on the touch screen.

5. The apparatus of claim 1, wherein the processor is configured to:
receive one or more inputs from among:
an audio signal generated by a user speaking, an audio signal generated by the user clapping hands, and air pressure generated by the user blowing air, and
wherein, when the processor predicts the movement of the virtual object, the processor is further configured to:
predict the movement of the virtual object based on the one or more inputs.

6. The apparatus of claim 1, wherein the processor is configured to:
determine a value of force and a direction of the force created by the external input, and
wherein, when the processor predicts the movement of the virtual object, the processor is further configured to:
predict the movement of the virtual object based on the value of the force and the direction of the force.

7. The apparatus of claim 1, wherein the machine learning model is trained based on at least one of previously recorded images and previously recorded videos of a physical object that moves in physical space in response to user stimulus.

8. A method comprising:
receiving, via a sensor of an apparatus, an external input from a user to control a virtual object displayed in a virtual space by the apparatus;
sending, by the apparatus, a message comprising an identification of a type of the external input and a value of the external input, as measured by the sensor, to a machine-learning model, wherein the machine-learning model comprises a convolutional neural network (CNN) layer and a generative adversarial network (GAN);
identifying by the CNN layer a first bounding box corresponding to an approximate location of the virtual object in a current image of the virtual space before the external input is applied and a second bounding box corresponding to a predicted location of the virtual object in a next image of the virtual space after the external input is applied;
receiving by the GAN the second bounding box from the CNN layer;
predicting a location of the virtual object in the next image based on the external input of the user and the second bounding box; and
moving, by the apparatus, the virtual object in the virtual space based on the predicted location of the virtual object in the next image.

9. The method of claim 8, wherein the receiving further comprises:
receiving the external input with respect to a current image of the virtual space, and
wherein the predicting further comprises:
predicting the movement of the virtual object in a subsequent image of the virtual space.

10. The method of claim 8, wherein the receiving further comprises:
determining a type of user interaction of the external input from a plurality of different possible types of the user interactions, and
wherein the predicting further comprises:
predicting the movement of the virtual object based on the determined type of the user interaction.

11. The method of claim 8, wherein the receiving further comprises:
receiving a touch input on a touch screen, and
wherein the predicting further comprises:
predicting the movement of the virtual object based on a pressure value and a distance of movement of the touch input on the touch screen.

12. The method of claim 8, wherein the receiving further comprises:
receive one or more inputs from among:
an audio signal generated by a user speaking, an audio signal generated by the user clapping hands, and air pressure generated by the user blowing air, and
wherein the predicting further comprises:
predicting the movement of the virtual object in virtual space based on the one or more inputs.

13. The method of claim 8, further comprising:
determining a value of force and a direction of the force created by the external input of the user, and
wherein the predicting further comprises:
predicting the movement of the virtual object in virtual space based on the value of the force and the direction of the force.

14. The method of claim 8, wherein the machine learning model is trained based on at least one of previously recorded images and previously recorded videos of a physical object that moves in physical space in response to user stimulus.

15. A computer program product comprising a computer-readable medium storing instructions that, when executed by a processor, cause the processor to perform:

receiving, via a sensor of an apparatus, an external input from a user to control a virtual object displayed in a virtual space by the apparatus;

sending, by the apparatus, a message comprising an identification of a type of the external input and a value of the external input, as measured by the sensor, to a machine-learning model, wherein the machine-learning model comprises a convolutional neural network (CNN) layer and a generative adversarial network (GAN);

identifying by the CNN layer a first bounding box corresponding to an approximate location of the virtual object in a current image of the virtual space before the external input is applied and a second bounding box corresponding to a predicted location of the virtual object in a next image of the virtual space after the external input is applied;

receiving by the GAN the second bounding box from the CNN layer;

predicting a location of the virtual object in the next image based on the external input of the user and the second bounding box;

and moving, by the apparatus, the virtual object in the virtual space based on the predicted location of the virtual object in the next image.

16. The computer program product of claim 15, wherein the receiving further comprises:

receiving the external input with respect to a current image of the virtual space, and wherein the predicting further comprises:

predicting the movement of the virtual object in a subsequent image of the virtual space.

\* \* \* \* \*